(12) United States Patent
Fang et al.

(10) Patent No.: US 8,988,239 B2
(45) Date of Patent: Mar. 24, 2015

(54) FAILURE ALARM SYSTEM AND METHOD OF FAILURE ALARMING THEREOF

(71) Applicant: Cheng Uei Precision Industry Co., Ltd., New Taipei (TW)

(72) Inventors: Hsuan Chi Fang, New Taipei (TW); Chien Yu Lu, New Taipei (TW); Yi Hao Chiu, New Taipei (TW); Cheng Kang Chou, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 118 days.

(21) Appl. No.: 13/892,219

(22) Filed: May 10, 2013

(65) Prior Publication Data
US 2014/0333447 A1    Nov. 13, 2014

(51) Int. Cl.
*B29C 45/76* (2006.01)

(52) U.S. Cl.
CPC .................................. *B29C 45/768* (2013.01)
USPC ............................ 340/679; 340/506; 340/521

(58) Field of Classification Search
CPC .... G08B 21/18; G08B 21/187; G08B 25/002; G08B 25/014; B29C 45/768
USPC ......... 340/506, 507, 521, 611, 614, 626, 648, 340/679, 680, 683; 73/587, 660, 649, 650; 702/182, 186
See application file for complete search history.

(56) References Cited

U.S. PATENT DOCUMENTS

| | | | | |
|---|---|---|---|---|
| 4,881,058 | A * | 11/1989 | Berry, III | 340/326 |
| 7,187,773 | B2 * | 3/2007 | Hamada et al. | 381/56 |
| 2005/0174229 | A1 * | 8/2005 | Feldkamp et al. | 340/506 |
| 2008/0183429 | A1 * | 7/2008 | Piety et al. | 702/185 |

* cited by examiner

*Primary Examiner* — Hung T Nguyen
(74) *Attorney, Agent, or Firm* — Lin & Associates IP, Inc.

(57) ABSTRACT

A failure alarm system adapted for monitoring an instrument includes a BUS transmitting data and control logics inside the failure alarm system, a recording device connected to the BUS for recording operating sounds of the instrument, a voice processing unit connected to the BUS for converting the operating sounds into a voice eigenvector, a storage unit connected to the BUS for storing the voice eigenvector at the normal working state of the instrument as historical data and also storing the voice eigenvector at the abnormal working state of the instrument therein, a comparing unit connected to the BUS for comparing the new voice eigenvector with the previous voice eigenvector saved as the historical data to judge whether the instrument is at the abnormal working state, and a warning unit connected to the BUS for warning the monitoring personnel when the abnormal state is detected.

9 Claims, 4 Drawing Sheets

FAILURE ALARM SYSTEM AND METHOD OF FAILURE ALARMING THEREOF

BACKGROUND OF THE INVENTION

1. Field of the Invention

This invention relates to an alarming system, in particular, relates to a failure alarm system and a method of failure alarming thereof.

2. The Related Art

In order to achieve mass production, various instruments are used on the production line, but the instruments might go wrong after a long-time operation, and the failure of any instrument operation will decrease the yield rate. In addition, if the failure does not be detected and solved immediately but keeping the instrument running, it may damage the instrument and result in great losses to the product line.

Therefore, if the failure can be detected in advance so as to overhaul the instrument before the instrument being damaged, the loss can be efficiently reduced.

Although there are many kinds of methods for detecting the failures, such as video surveillance, pressure surveillance, tempura surveillance and mold clamping pressure surveillance which monitors each kind of parameter inside the mold, or vibration intensity surveillance for the instrument itself, all of the detecting methods above can only monitor a specific parameter. If the instrument is changed, the monitoring parameter and the detecting method have to be redesigned to suit new instrument. Besides, said detecting method cannot monitor the interaction between the instrument and the mold. So if the failure fails to trigger the parameters said above, the alarm system cannot provide any warning at all.

Taking the plastic injection molding machine for example, the pressure, the temperature and the mold clamping pressure of the injection material do not change obviously when the injection molding machine only deforms slightly, so it is difficult to detect the failure with conventional detecting method. In most of time, the failure is detected when the product defect is discovered, and at this time, the damage to the product line is already done.

In view of these disadvantages above, it is necessary to provide an improved failure alarm system which is capable to detect unexpected abnormal states more widely.

SUMMARY OF THE INVENTION

An objective of this invention is to provide a failure alarm system which is capable to monitor verity kinds of instruments for different types of abnormal states, and provides an early warning to the monitoring personnel to shut down and solve problems occurred on the instrument immediately.

In order to achieve said objective, the failure alarm system in this invention includes a BUS transmitting data and control logics inside the failure alarm system, a recording device connected to the BUS for recording operating sounds of the instrument, a voice processing unit connected to the BUS for converting the operating sounds into a voice eigenvector, a storage unit connected to the BUS for storing the voice eigenvector of the instrument at the normal working state as historical data and also storing the voice eigenvector at the abnormal working state of the instrument therein, a comparing unit connected to the BUS for comparing a new voice eigenvector with the previous voice eigenvector saved as the historical data to judge whether the instrument is at abnormal working state, and a warning unit connected to the BUS for warning the monitoring personnel when abnormal state is detected.

And a method of failure alarming of the failure alarm system includes the steps:

Recording the operating sounds of the instrument with the recording device in a controlled situation where the instrument is ensured to work normally periodically, converting the operating sounds recorded in the controlled situation into a voice eigenvector by means of the voice processing unit and storing the voice eigenvector into the storage unit as historical data; keeping on recording the operating sounds of the instrument in actual operation with the recording device; converting the operating sounds recorded in actual operation into a new voice eigenvector with the voice processing unit tee; comparing the new voice eigenvector with the previous voice eigenvector saved as the historical data to judge whether the instrument is at an abnormal working state; and warning the monitoring personnel when the compare result shows the abnormal working state occurs, and storing the new voice eigenvector of the instrument at the abnormal working state into the storage unit.

As described above, the failure alarm system in this invention monitors the instrument by comparing the operating sounds, and provides a much more comprehensive monitoring function that suit for any instruments. Besides, all of the voice eigenvectors are stored in the storage unit, so the failure alarm system is capable to help the monitoring personnel to determine the possible reason of failure when the instrument is at abnormal working state.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
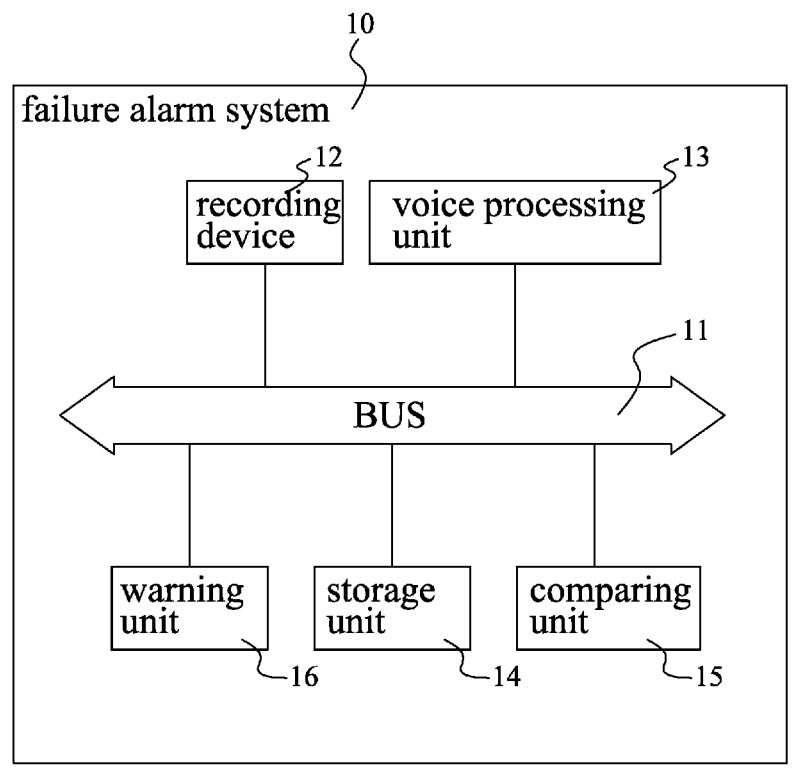
FIG. 1 shows a block diagram of a failure alarm system in accordance with an embodiment of the present invention.
Figure 2:
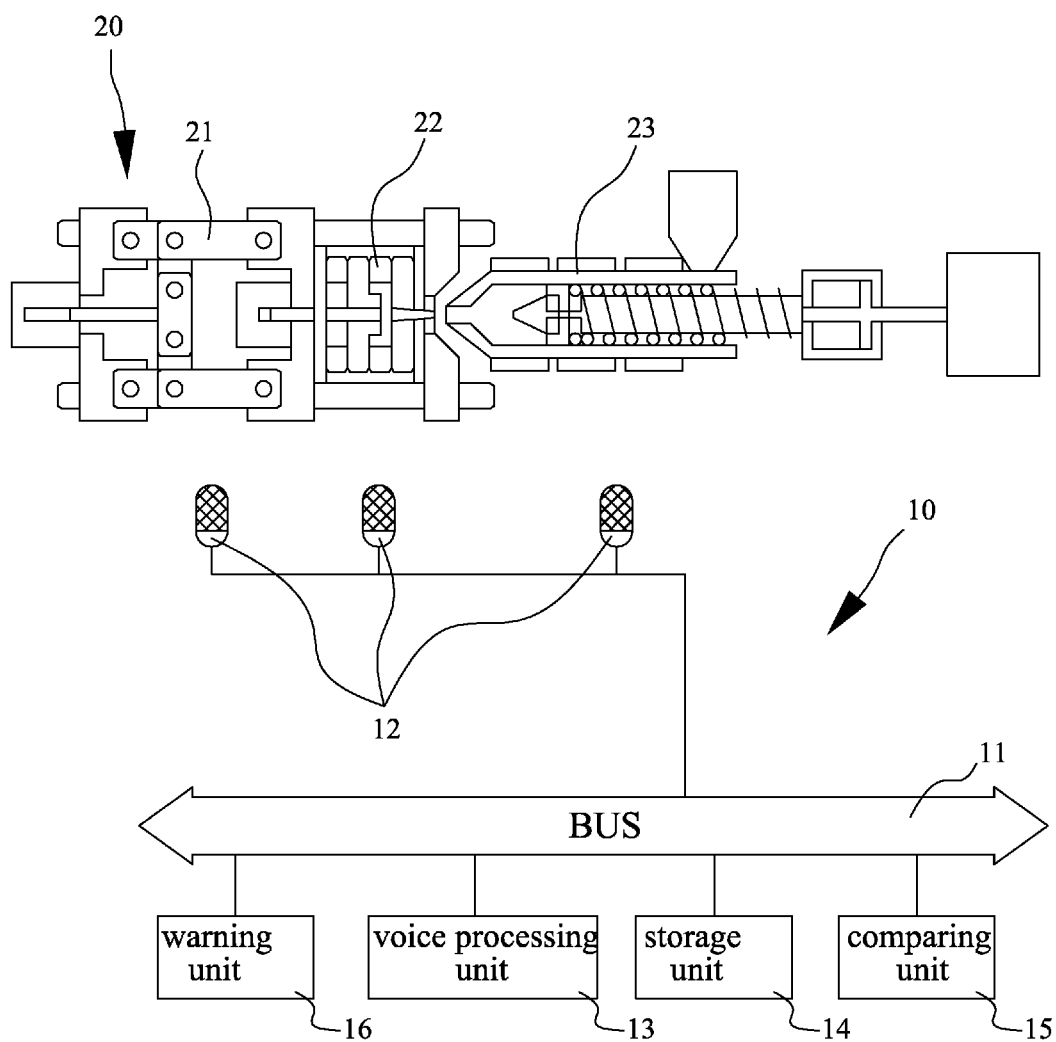
FIG. 2 is a schematic diagram showing the failure alarm system of FIG. 1 is used to monitor an instrument.

With reference to FIG. 1 and FIG. 2, a failure alarm system 10 in this invention is adapted for monitoring an instrument 20 by comparing operating sounds. The failure alarm system 10 includes a BUS 11 assembled in the failure alarm system 10 for transmitting each kinds of data and control logics, a recording device 12 connected to the BUS 11 for recording operating sounds of the instrument 20, a voice processing unit 13 connected to the BUS 11 for converting the operating sounds into a voice eigenvector, a storage unit 14 connected to the BUS 11 for storing the converted voice eigenvector at the normal working state of the instrument 20 as historical data and also storing the voice eigenvector at the abnormal working state of the instrument 20 therein, a comparing unit 15 connected to the BUS 11 for comparing the new voice eigenvector with the previous voice eigenvector saved as the historical data to judge whether the instrument 20 is at the abnormal working state, and a warning unit 16 connected to the BUS 11 for warning the monitoring personnel when the abnormal state is detected.

Because the failure alarm system 10 in this invention monitors the operation of the instrument 20 by comparing the operating sounds of the instrument 20 with the historical data, this system can be used on any kinds of instruments without redesigning sensors or monitoring physical quantities.

Referring to FIG. 2, the instrument 20 in this embodiment is a plastic injection molding machine, and in order to monitor each part of the injection molding machine in detail, the failure alarm system 20 is equipped with a plurality of recording devices 12 that respectively placed next to each part of the instrument 20 such as a clamping unit 21, a mold 22 and an injection unit 23. Besides, all of the recording devices 12 are directional microphones adapted to avoid the interference of the environment noise. With the characteristic of picking up sound from a certain direction, the directional microphone can record the operating sound generated from a particular element in the instrument 20.

The warning unit 16 is a monitor screen for displaying the working condition of the instrument 20 and providing the monitoring personnel with an output interface to control the failure alarm system 10.

Figure 3:
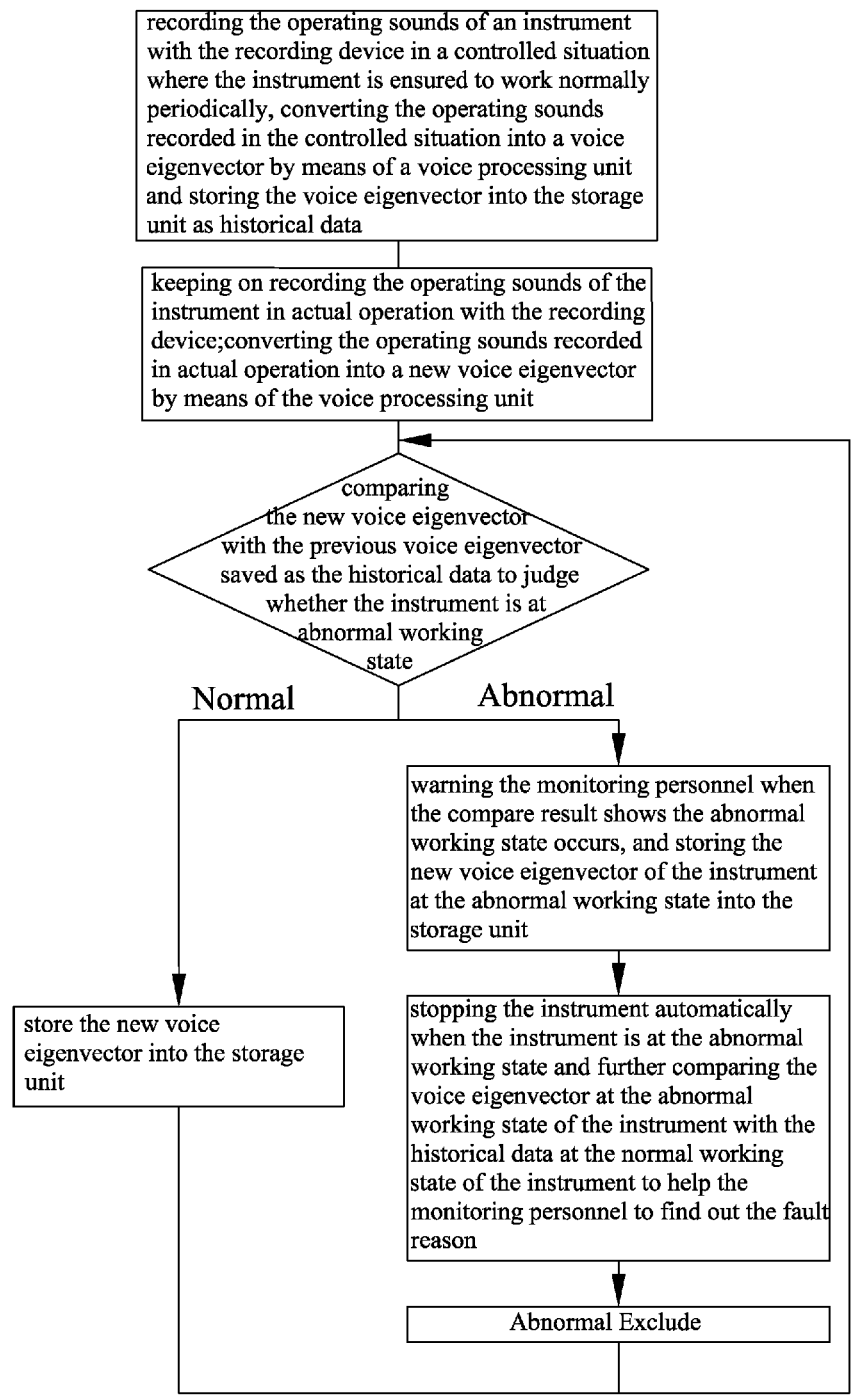
FIG. 3 shows a flowchart of a method of failure alarming of the failure alarm system of FIG. 1.

Referring to FIG. 2 and FIG. 3, a method of failure alarming of the failure alarm system 10 in this invention is described as follows.

Firstly, record the operating sounds of the instrument with the recording device 12 in a controlled situation where the instrument 20 is ensured to work normally periodically, convert the operating sounds recorded in the controlled situation into a voice eigenvector by means of the voice processing unit 13 and storing the voice eigenvector into the storage unit 14 as historical data. Then, keep on recording the operating sounds of the instrument 20 in actual operation with the recording device 12. Then convert the operating sounds recorded in actual operation into a new voice eigenvector by means of the voice processing unit 13. Next, compare the new voice eigenvector with the previous voice eigenvector saved as the historical data to judge whether the instrument 20 is at the abnormal working state. Last, warn the monitoring personnel when the compared result shows the abnormal working state occurs, and store the new voice eigenvector of the instrument 20 at the abnormal working state into the storage unit 14.

In detail, if the compare result shows the operating sound in actual operation is similar to the historical data and the instrument 20 works normally now, then the failure alarm system 10 stores the new voice eigenvector into the storage unit 14 and then keeps monitoring the instrument 20. In opposite, if the compare result shows the operating sound in actual operation is obviously different with the historical data and something in the instrument 20 or the mold 22 may go wrong, then the failure alarm system 10 stores the new voice eigenvector at abnormal state into the storage unit 14 and warns the monitoring personnel to check the instrument 20 with the warning unit 16. Furthermore, the failure alarm system 10 will stop the instrument 20 automatically when the instrument 20 is at the abnormal working state and compare the new voice eigenvector at the abnormal working state of the instrument 20 with the historical data at the normal state of the instrument 20 to help the monitoring personnel finding out the fault reason.

Figure 4:
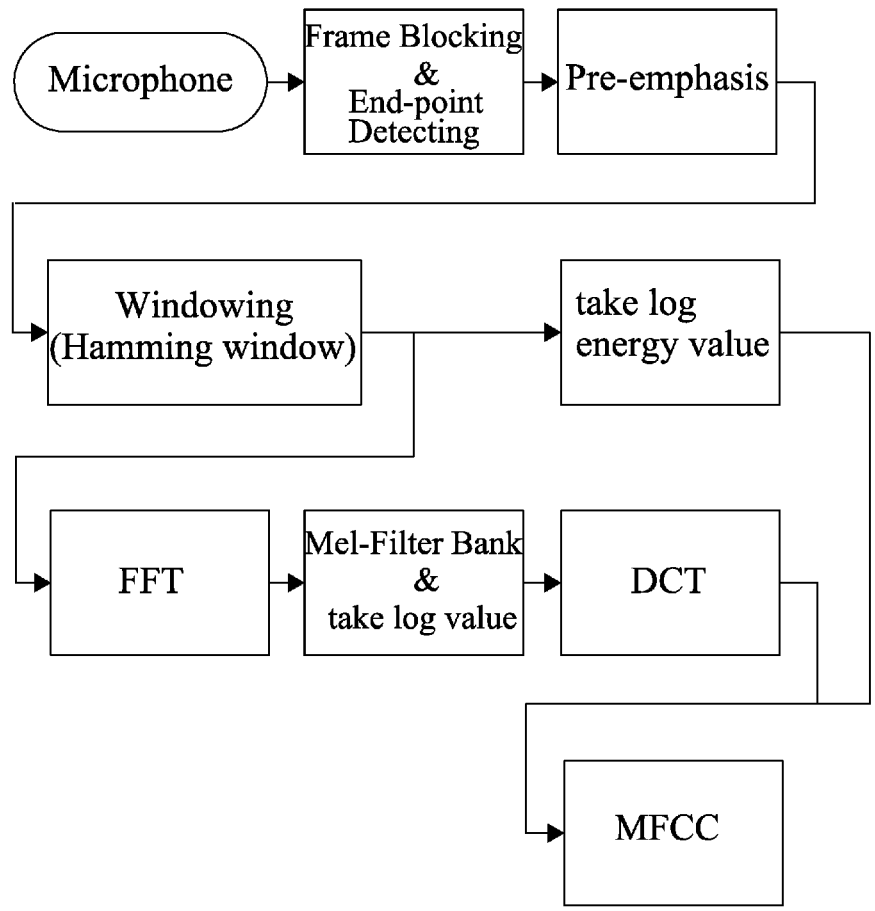
FIG. 4 shows a flowchart of the steps for converting the operating sounds into the voice eigenvector.

Referring to FIG. 4, a feasible method of converting the operating sounds into voice eigenvectors is described follows.

Firstly, find the end-point of the operating sound in the wave form to take voice data of the voiced regions (the process referred as end-point detection). Then break the voice data into several frames of which each goes through a very short time period (the process referred as frame blocking), and contains a unit block of sound. So the working condition of the instrument 20 can be monitored by comparing new recorded frames with history frames stored in the storage unit 14 in sequence.

However, the recorded operating sound might include noises in the environment. In order to avoid the noises from affecting the compare result, a pre-emphasis filter is applied to each frame to increase the resonance peak value within a particular frequency band with respect to the magnitude of other frequencies in order to improve the overall signal-to-noise ratio (the process referred as pre-emphasis).

Next, apply a window function to each frame to improve the continuity of data at two ends of the frame (the process referred as windowing). The window function used in this embodiment is a hamming window. Then take the logarithmic value of each windowed frame and convert the windowed frames from time domain into frequency domain with Fast Fourier Transform.

After the operating sound is converted from time domain to the frequency domain, in order to express the characteristic of frames more clearly, a Mel-filter band is applied to each frame and then take the logarithmic value of the frames. And then use the Discrete Cosine Transform and the logarithmic value to determine the Mel-scale frequency cepstral coefficients and the voice eigenvector.

When the eigenvector of operating sounds is determined, use Dynamic Time Warping to compare the voice eigenvector of new recorded operating sounds and the historical data to determine the degree of difference therebetween. If the difference is small, it means the instrument 20 is working normally. But if there is an obvious difference between the new recorded operating sound and the historical operating sound, it indicates the instrument 20 at abnormal working state, at this time, warn the monitoring personnel immediately.

In addition, the failure alarm system 10 in this invention can also help the monitoring personnel to determine the failure reason by comparing the voice eigenvector of the new recorded operating sound at the abnormal working state of the instrument 20 with the historical data at the normal working state of the instrument 20 in sequence, and then list failure reasons with similar voice eigenvector.

As described above, the failure alarm system 10 in this invention monitors the instrument 20 by recording the operating sounds of the instrument 20, so it can provide a much more comprehensive monitoring function that suit for any kinds of instruments 20. Besides, all of the voice eigenvectors are stored in the storage unit 14, so the failure alarm system 10 in this invention is capable to help the monitoring personnel determining the possible reason of failure when the instrument 20 is at abnormal working state.

What is claimed is:

1. A failure alarm system adapted for monitoring an instrument, comprising:
   a BUS transmitting data and control logics inside the failure alarm system;
   a recording device connected to the BUS for recording operating sounds of the instrument;
   a voice processing unit connected to the BUS for converting the operating sounds into a voice eigenvector;
   a storage unit connected to the BUS for storing the voice eigenvector at a normal working state of the instrument as historical data and also storing the voice eigenvector at an abnormal working state of the instrument therein;
   a comparing unit connected to the BUS for comparing a new voice eigenvector with the previous voice eigenvector saved as the historical data to judge whether the instrument is at the abnormal working state; and a warning unit connected to the BUS for warning monitoring personnel when the abnormal state is detected.

2. The failure alarm system as claimed in claim 1, wherein the recording device is a directional microphone.

3. The failure alarm system as claimed in claim 1, wherein the warning unit is a monitor screen.

4. A method of failure alarming of a failure alarm system, comprising:

recording operating sounds of an instrument with a recording device in a controlled situation where the instrument is ensured to work in a normal working state periodically, converting the operating sounds recorded in the controlled situation into a voice eigenvector using a voice processing unit and storing the voice eigenvector into a storage unit as historical data;

keeping on recording the operating sounds of the instrument in actual operation with the recording device;

converting the operating sounds recorded in actual operation into a new voice eigenvector using the voice processing unit;

comparing the new voice eigenvector with the previous voice eigenvector saved as the historical data to judge whether the instrument is at an abnormal working state; and warning monitoring personnel when the compared result shows the abnormal working state occurs, and storing the new voice eigenvector of the instrument at the abnormal working state into the storage unit.

5. The method as claimed in claim 4, wherein the steps for converting the operating sounds into the voice eigenvector comprising:

finding an end-point of the operating sounds in a wave form to take voice data of voice regions;

breaking the voice data into several frames of which each goes through a very short time period and contains a unit block of sound;

applying a pre-emphasis filter to each frame to increase a resonance peak value within a particular frequency band with respect to magnitudes of other frequencies in order to improve an overall signal-to-noise ratio;

applying a window function to each frame;

converting the windowed frames from a time domain into a frequency domain with Fast Fourier Transform; and using a Mel-filter band and the Discrete Cosine Transform to determine Mel-scale frequency cepstral coefficients and the voice eigenvector.

6. The method as claimed in claim 5, wherein the window function is a hamming window function to improve continuity of data at two ends of the frame.

7. The method as claimed in claim 4, wherein the method for comparing the voice eigenvector and the historical data uses Dynamic Time Warping to determine the degree of difference therebetween.

8. The method as claimed in claim 4, further comprising the step of stopping the instrument automatically when the instrument is at the abnormal working state and further comparing the voice eigenvector at the abnormal working state of the instrument with the historical data at the normal working state of the instrument to help the monitoring personnel to find out a fault reason of the abnormal working state.

9. The method as claimed in claim 4, wherein when the compared result shows the instrument works normally, the new voice eigenvector is stored into the storage unit.

* * * * *